US008147580B2

(12) United States Patent
Lin

(10) Patent No.: US 8,147,580 B2
(45) Date of Patent: Apr. 3, 2012

(54) DUST COLLECTOR

(75) Inventor: Chih-Peng Lin, Taichung (TW)

(73) Assignee: Meta International Co., Ltd., Taichung (TW)

( * ) Notice: Subject to any disclaimer, the term of this patent is extended or adjusted under 35 U.S.C. 154(b) by 212 days.

(21) Appl. No.: 12/720,740

(22) Filed: Mar. 10, 2010

(65) Prior Publication Data

US 2011/0219734 A1 Sep. 15, 2011

(51) Int. Cl.
*B01D 47/00* (2006.01)

(52) U.S. Cl. ............ 55/429; 55/428; 221/198; 220/200; 220/380

(58) Field of Classification Search .................... 55/428, 55/429; 221/198; 220/200–380
See application file for complete search history.

(56) References Cited

U.S. PATENT DOCUMENTS

| | | | | |
|---|---|---|---|---|
| 4,993,107 | A * | 2/1991 | Zoni | 15/352 |
| 5,882,379 | A * | 3/1999 | Johnson | 95/19 |
| 6,117,201 | A * | 9/2000 | Cheng | 55/356 |
| 6,221,135 | B1 * | 4/2001 | Wirth et al. | 95/273 |
| 6,507,974 | B1 * | 1/2003 | Cheng | 15/347 |
| 6,797,046 | B2 * | 9/2004 | Wang | 96/421 |
| 6,833,016 | B2 * | 12/2004 | Witter | 55/337 |
| D501,964 | S * | 2/2005 | Cheng | D32/21 |
| D502,297 | S * | 2/2005 | Cheng | D32/21 |
| 6,875,248 | B1 * | 4/2005 | Shelton et al. | 55/356 |
| 7,044,991 | B2 * | 5/2006 | Wang | 55/366 |
| 7,074,261 | B2 * | 7/2006 | Murphy | 96/223 |
| 7,186,281 | B2 * | 3/2007 | Cheng | 55/289 |
| 7,217,307 | B2 * | 5/2007 | Cheng | 55/356 |
| 7,260,868 | B2 * | 8/2007 | Cheng | 15/347 |
| 7,550,021 | B2 * | 6/2009 | Witter | 55/295 |
| 7,695,537 | B2 * | 4/2010 | Cheng | 55/467 |
| 7,695,538 | B2 * | 4/2010 | Cheng | 55/467 |
| 7,824,457 | B2 * | 11/2010 | Witter | 55/337 |
| D629,575 | S * | 12/2010 | Cheng | D32/21 |
| D629,576 | S * | 12/2010 | Cheng | D32/21 |
| D630,391 | S * | 1/2011 | Cheng | D32/21 |
| D630,392 | S * | 1/2011 | Lin | D32/21 |
| 2006/0016162 | A1 * | 1/2006 | Lin | 55/428 |

FOREIGN PATENT DOCUMENTS

| | | |
|---|---|---|
| TW | M336816 | 7/2008 |

* cited by examiner

*Primary Examiner* — Jason M Greene
*Assistant Examiner* — Dung Bui
(74) *Attorney, Agent, or Firm* — Alan Kamrath; Kamrath IP Lawfirm, PA

(57) ABSTRACT

A lid-opening apparatus for a dust collector includes a base installed on a lid, a controller connected on the base, a cord defining a first end associated with a conduit and a second end associated with the frame, and a limiting member associated with the cord and between the first end and the second end of the cord. The controller can be rotated to a first position and a second position. While the controller is in the first position, the cord is in a loose condition, a flexible portion of the conduit is stretched, and the lid seals the container. While the controller is in the second position, the cord is in a tight condition, the flexible portion of the conduit shortens, and the lid leaves the container.

9 Claims, 8 Drawing Sheets

DUST COLLECTOR

BACKGROUND OF THE INVENTION

1. Field of the Invention

The present invention relates generally to a dust collector and, more particularly, to a dust collector having a lid-opening apparatus assembled thereon.

2. Description of the Related Art

Taiwan Patent M336816 discloses a dust-collecting assembly having a support structure, a dust collector installed on the support structure, and a container. The dust collector includes a lid connected thereon. The lid has a first position in which the lid is spaced from the container so that the container can be moved and a second position in which the lid is abutted against the container to provide a seal therebetween. A base is provided on the support structure and adjacent to the dust collector. A handle has a proximal end pivotally connected with the base. The handle further associates with a bar connected with one side of the lid of the dust collector. The lid will move up to the first position to facilitate the movement of the container when the handle is pulled up. The lid will move down to the second position when the handle is pulled down. The container includes an exhaust chamber formed thereon. The exhaust chamber can provide a vacuum condition to secure a bag installed in the container. A control system provided on one side of the support structure is used to control the dust collector.

According to the prior art, the base is provided on the support structure, and the bar is connected with one side of the lid. While the handle is pulled, the lid is imbalanced because only one side of the lid will move up and the other side of the lid will move down. Moreover, the imbalanced lid will make the container difficult to be removed when the handle is pulled up.

The present invention is, therefore, intended to obviate or at least alleviate the problems encountered in the prior art.

SUMMARY OF THE INVENTION

According to the present invention, the main purpose is to provide a dust collector which includes a lid, a lid-opening apparatus installed on the lid, a container and a conduit. The lid-opening apparatus includes a base, a controller, at least one cord and at least one limiting member. The controller is pivotally connected to the base, and the cord is associated with the conduit and the controller. While a user operates the controller, the cord will tighten, and the lid can be taken up steadily.

An advantage of the dust collector according to the present invention is that the cords of the lid-opening apparatus are respectively associated with two sides of the conduit and limiting members, and the limiting members are separately installed on two sides of the lid and corresponding to the two sides of the conduit. The lid can keep balance while the user operates the lid-opening apparatus.

Another advantage of the dust collector according to the present invention is that the controller is associated with the second ends of the cords so that the lid-opening apparatus can be easily operated by controlling the handle of the controller.

Other advantages and features of the present invention will become apparent from the following description referring to the drawings.

BRIEF DESCRIPTION OF THE DRAWINGS

The present invention will be described through detailed illustration of the preferred embodiments referring to the drawings.

DETAILED DESCRIPTION OF THE PREFERRED EMBODIMENT

Figure 1:
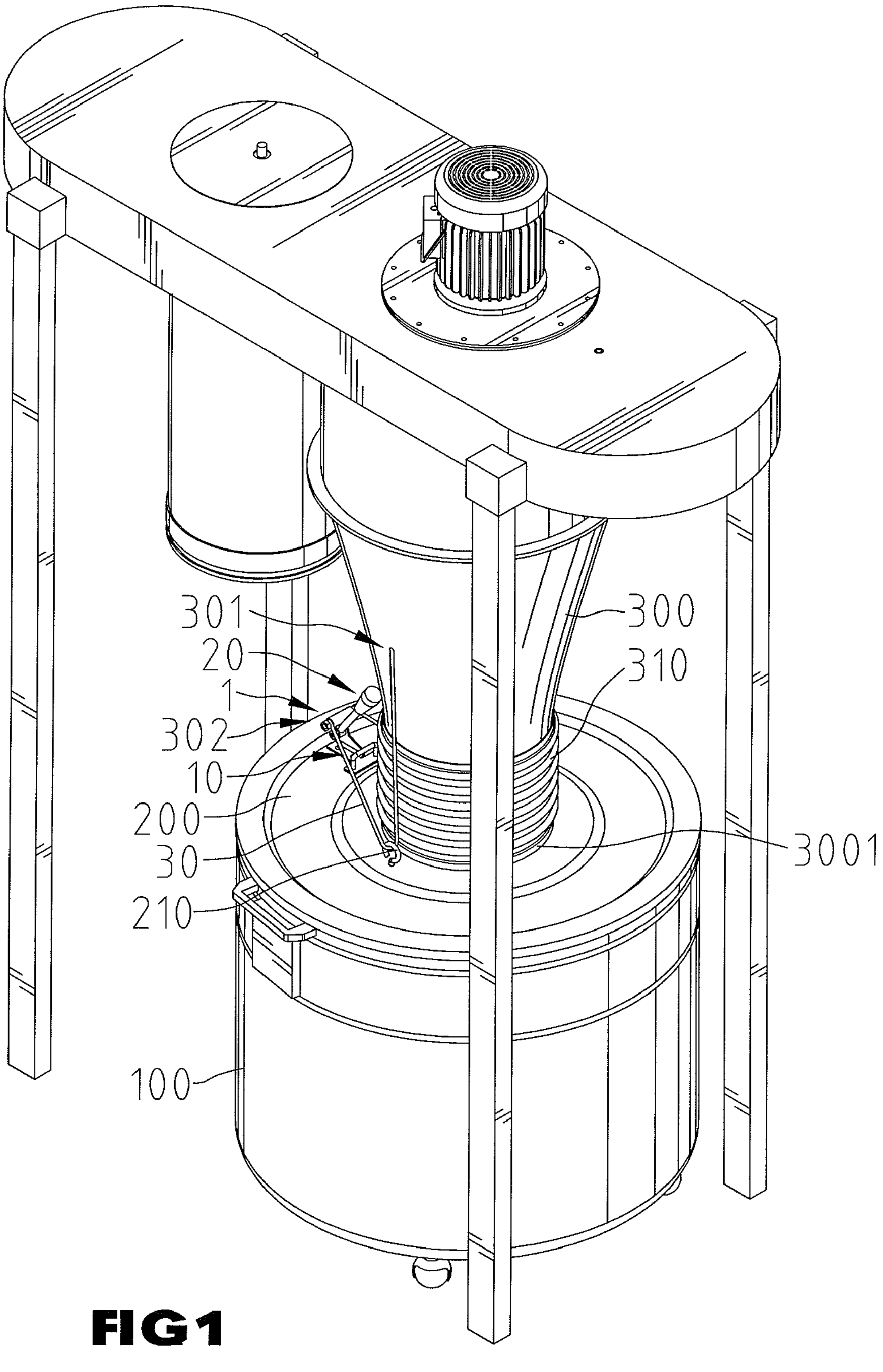
FIG. 1 is a perspective view of a dust collector according to the present invention.
Figure 2:
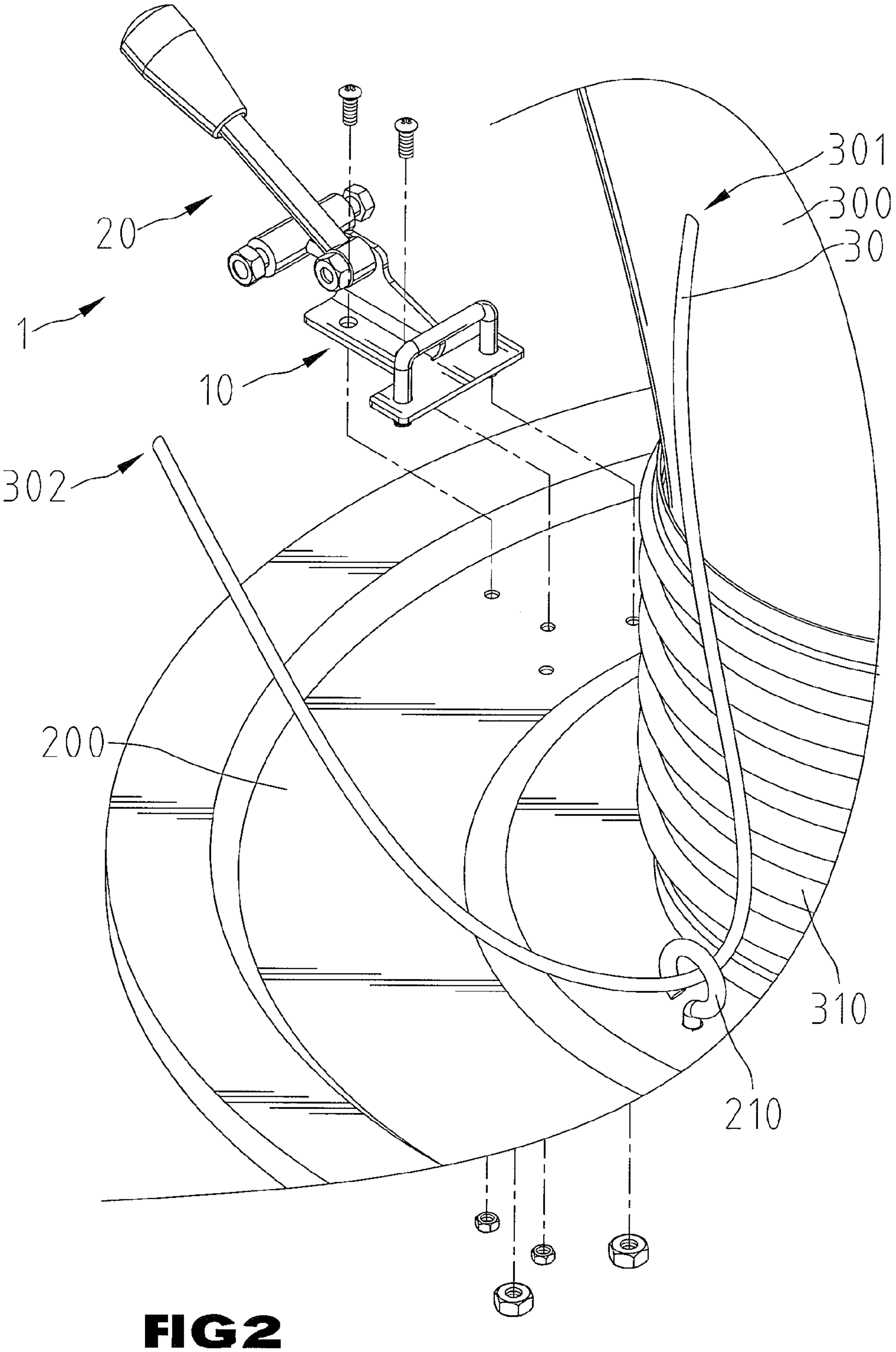
FIG. 2 is a partial, exploded view of the dust collector according to the present invention.

Referring to FIG. 1 and FIG. 2, there is shown a dust collector according to a first embodiment of the present invention. The dust collector includes a lid-opening apparatus 1, a container 100, a lid 200 and a conduit 300. The lid-opening apparatus 1 is installed on the lid 200 disposed between the container 100 and a lower end 3001 of the conduit 300. Preferably, the lid 200 is connected to the lower end 3001 of the conduit 300. Preferably, the conduit 300 further defines a flexible portion 310 adjacent to the lower end 3001 of the conduit 300. Dust, which is collected by the dust collector, will pass through the conduit 300 and the lid 200 and get into the container 100. When the container 100 needs to be cleaned, the lid 200 should be kept a distance from the container 100 to allow removal and cleaning of the container 100.

The lid-opening apparatus 1 comprises a base 10, a controller 20 and at least one cord 30. Preferably, the lid-opening apparatus 1 has two cords 30. The base 10 is disposed on the lid 200. The controller 20 is installed on the base 10. Each of the cords 30 includes a first end 301 associated with the conduit 300 and a second end 302 associated with the controller 20. Two limiting members 210, which are installed on the lid 200 and adjacent to the conduit 300, are respectively associated with the cords 30 and between the first end 301 and the second end 302 of the cord 30. Preferably, the limiting members 210 are hooks. The first ends 301 of the cords 30 are respectively associated with two sides of the conduit 300. The second ends 302 of the cords 30 are respectively associated with two sides of the controller 20. The controller 20 can be pivoted to a first position and a second position. In the first position, the cords 30 are in a loose condition, and the flexible portion 310 of the conduit 300 can be stretched so that the lid 200 can seal the container 100. Preferably, the lid 200 is tightly fit on the container 100. In the second position, the cords 30 are in a tight condition, and the flexible portion 310 of the conduit 300 shortens so that the lid 200 leaves the container 100. Preferably, the flexible portion 310 has a resilient force to keep the lid 200 spacing from the container 100. Since the first ends 301 of the cords 30 are respectively associated with two sides of the conduit 300, the lid 200 can leave the container 100 steadily.

Figure 3:
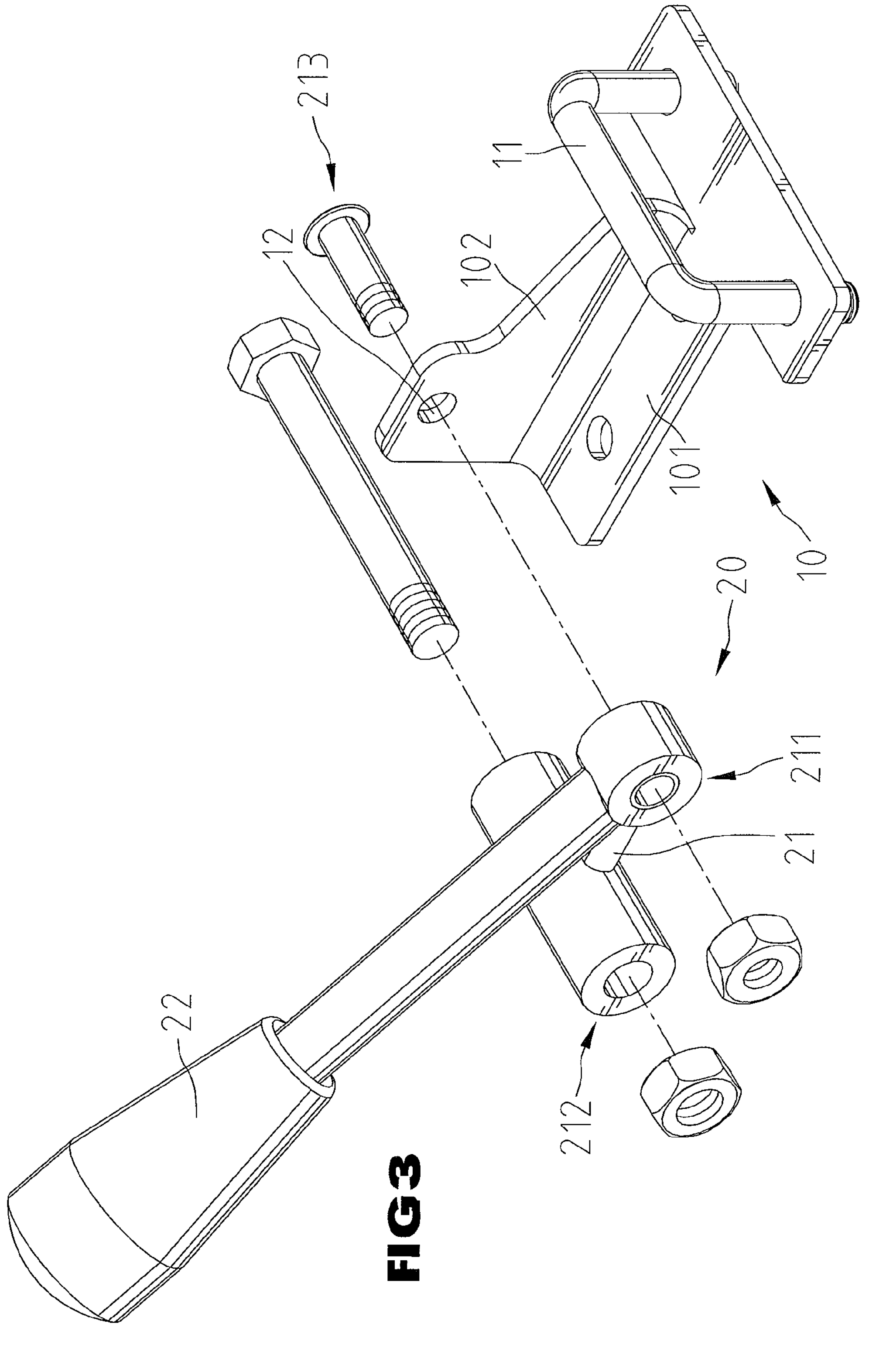
FIG. 3 is an exploded view of a lid-opening apparatus of the dust collector.
Figure 4:
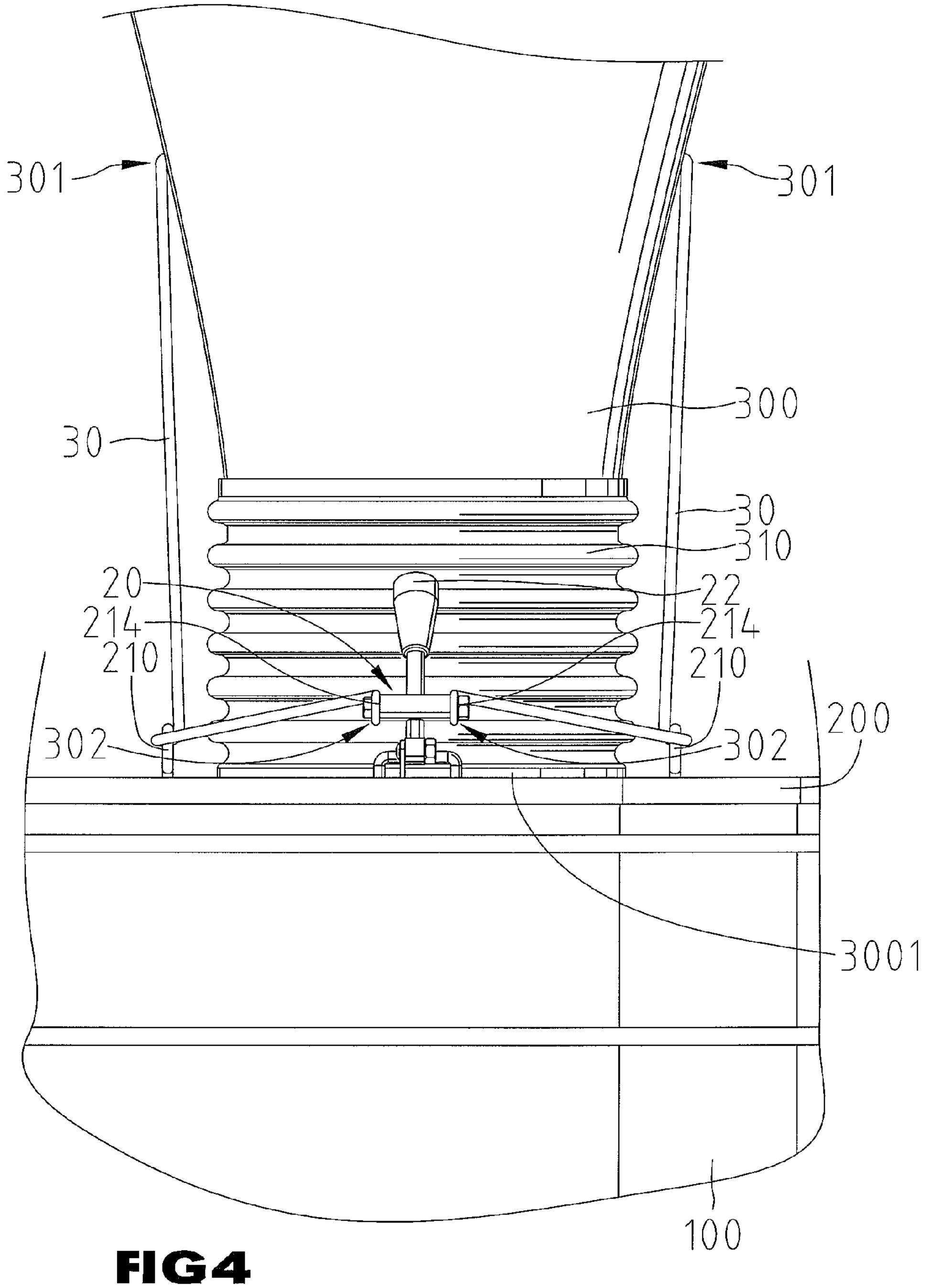
FIG. 4 is a partial, side view of the dust collector and shows the lid-opening apparatus.

Referring to FIG. 3 and FIG. 4, the base 10 includes a first portion 101 installed on the lid 200 and a second portion 102 extending away from and perpendicular to the lid 200. The first portion 101 of the base 10 further forms a grip 11 extending therethrough so that a user can lift the lid 200 up by grabbing the grip 11. The second portion 102 forms an aperture 12 extending therethrough.

The controller 20 includes a frame 21 and a handle 22. The frame 21 is substantially T shaped and includes a proximal end 211 and a distal end 212. The proximal end 211 of the frame 21 has a fastener 213 connected to the proximal end 211 of the frame 21 and the aperture 12 of the second portion 102 of the base 10. Two receiving portions 214 are respectively formed on two sides of the distal end 212 of the frame 21. Preferably, a bolt is inserted through the distal end 212 of the frame 21, and a nut is screwed on the bolt. One of the receiving portions 214 is formed between the frame 21 and a head of the bolt. The other receiving portion 214 is formed between the frame 21 and the nut. The handle 22, which is connected to the proximal end 211 of the frame 21, crosses over the distal end 212 of the frame 21.

The second ends 302 of the cords 30 are respectively wound on the receiving portion 214. The cord 30 can be a steel rope or a chain.

Figure 5:
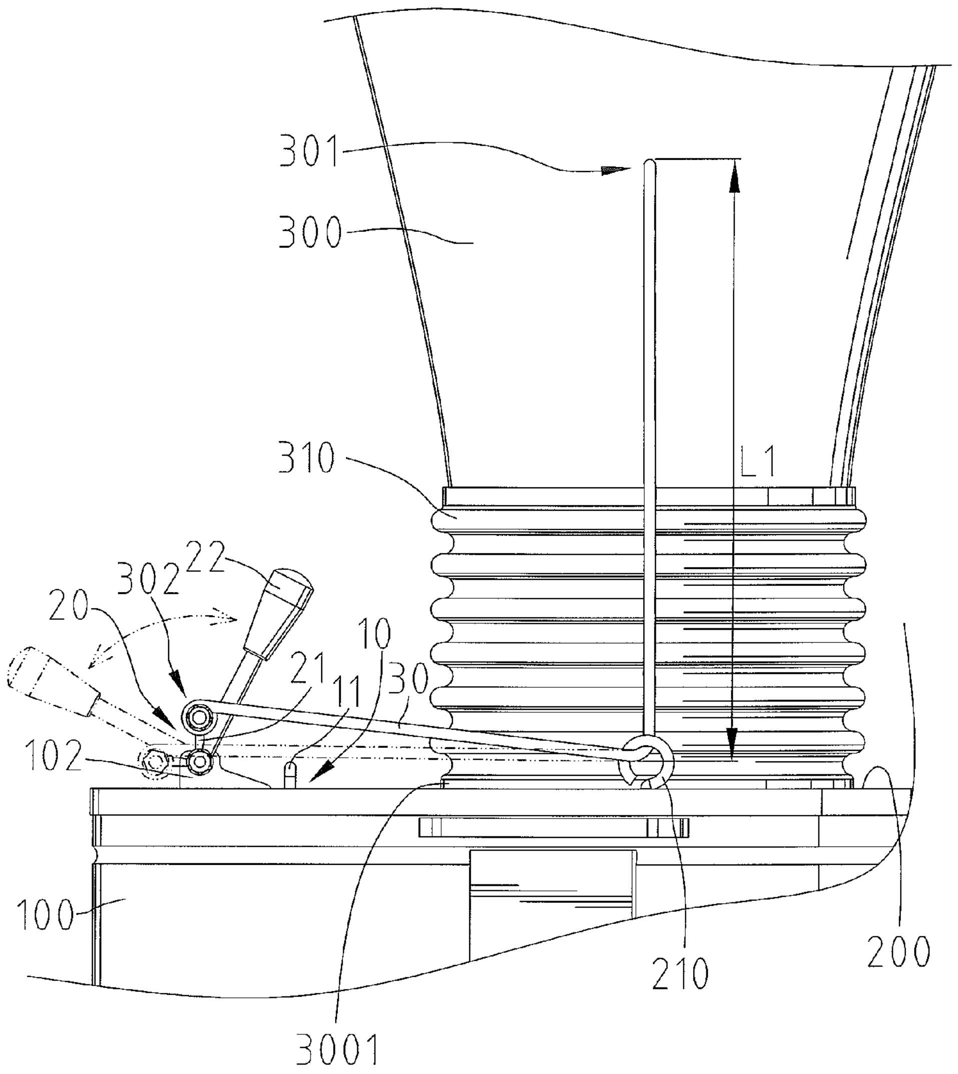
FIG. 5 is a front view of the dust collector and shows the lid-opening apparatus in a first position.
Figure 6:
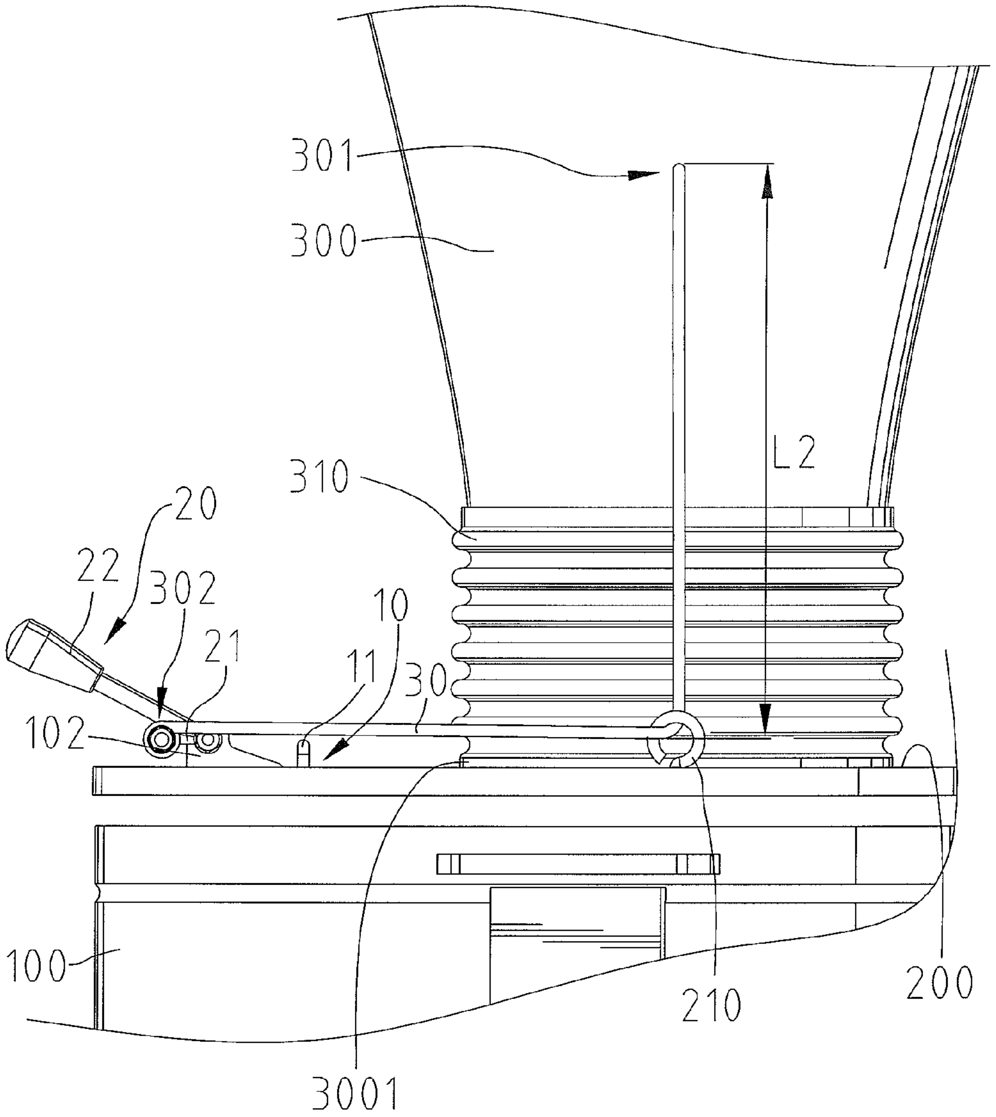
FIG. 6 is a front view of the dust collector and shows the lid-opening apparatus in a second position.

Referring to FIG. 5, the controller 20 is in the first position. The frame 21 is perpendicular with respect to the first portion 101 of the base 10 (as shown in FIG. 3). In the meanwhile, the first end 301 and second end 302 of the cord 30 are in the loose condition. A first length L1 is defined between the first end 301 of the cord 30 and the limiting member 210. In the meanwhile, the flexible portion 310 of the conduit 300 is stretched, and the lid 200 seals the container 100. Referring to FIG. 6, while rotating the controller 20 to the second position, the frame 21 will be parallel with respect to the first portion 101 of the base 10 (as shown in FIG. 3). In the meanwhile, the first end 301 and second end 302 of the cord 30 are in the tight condition. A second length L2 is defined between the first end 301 of the cord 30 and the limiting member 210. In the meanwhile, the second length L2 is less than the first length L1. In the meanwhile, the flexible portion 310 of the conduit 300 shortens, and the lid 200 leaves the container 100.

Figure 7:
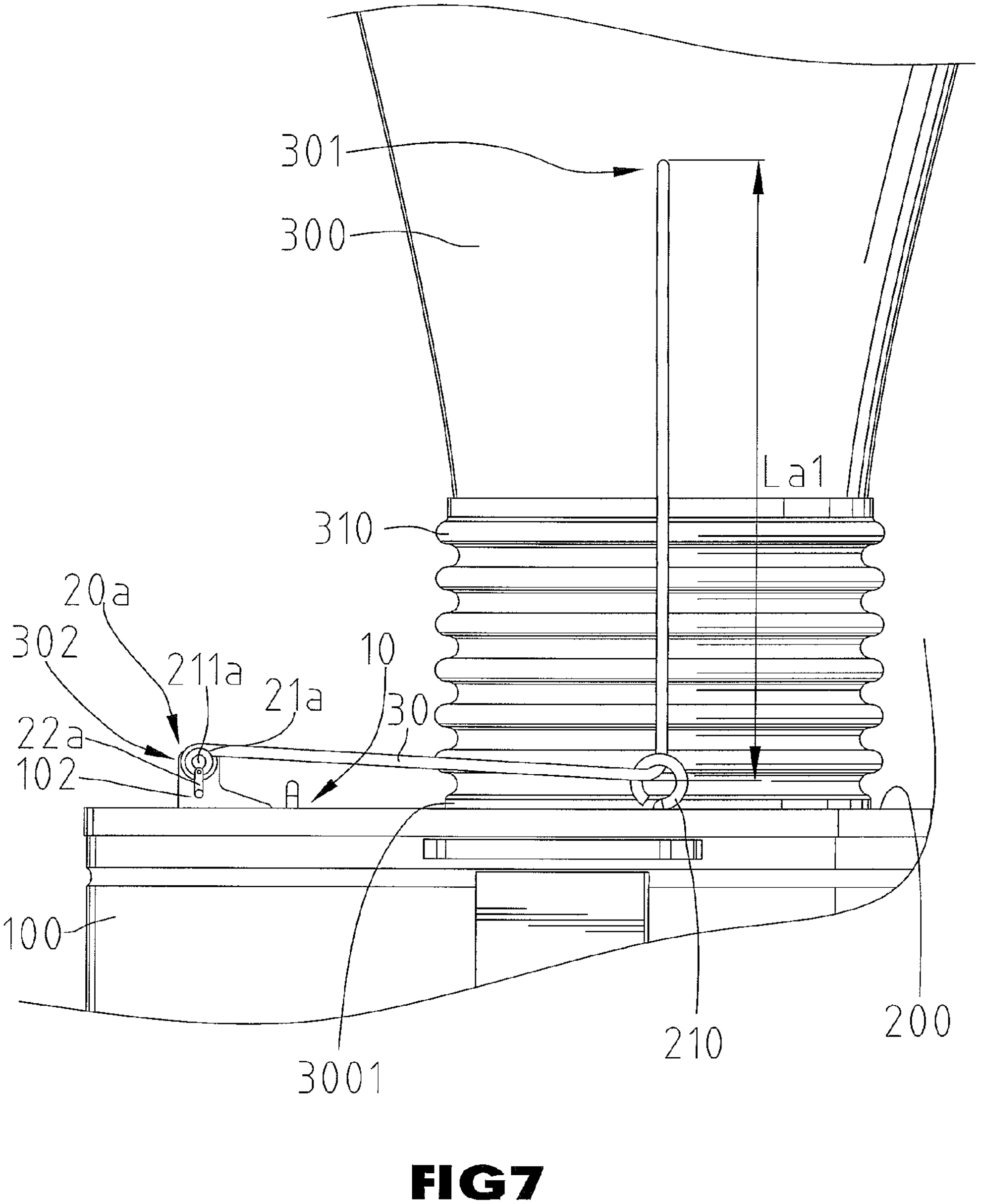
FIG. 7 is a front view of the dust collector in accordance with a second embodiment of the present invention and shows a lid-opening apparatus in a first position.
Figure 8:
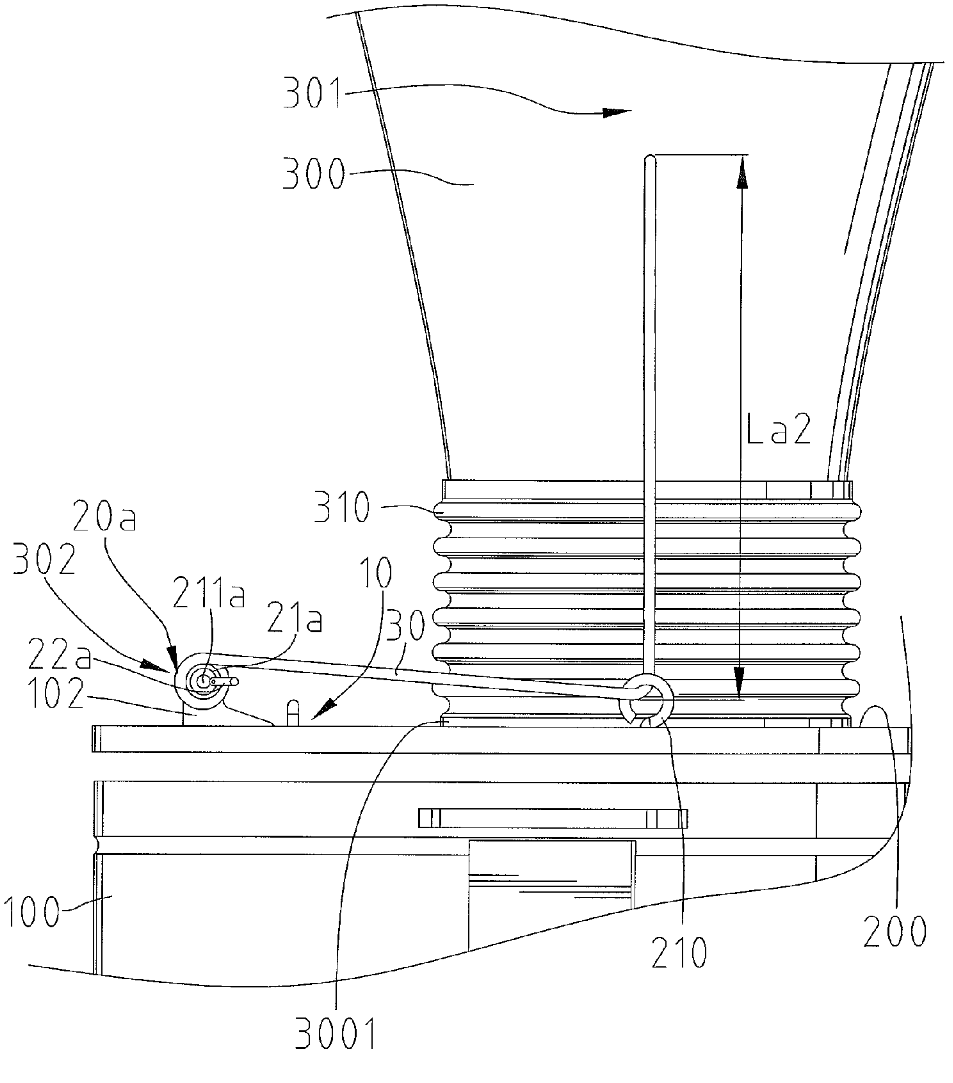
FIG. 8 is a front view of the dust collector shown in FIG. 7 and shows the lid-opening apparatus in a second position.

Referring to FIG. 7 and FIG. 8, there is shown a dust collector according to a second embodiment of the present invention. The second embodiment is like the first embodiment except that there is used a controller 20*a* instead of the controller 20. The controller 20*a* includes a frame 21*a* and a handle 22*a*. The frame 21*a* has a fastener 211*a* connected thereon, and the frame 21*a* is pivotally assembled on the second portion 102 of the base 10 by the fastener 211*a*. The handle 22*a* is associated with an edge of the fastener 211*a*. The second ends 302 of the cords 30 are respectively associated with two sides of the fastener 211*a* of the frame 21*a*. While the user rotates the handle 22*a*, the fastener 211*a* is rotated so that the cords 30 can be tightened or loosened.

The controller 20*a* can be rotated to a first position and a second position. While the controller 20*a* is clockwise rotated to the first position, the fastener 211*a* is rotated to unwind the second ends 302 of the cords 30 by operating the handle 22*a*. In the meanwhile, the first end 301 and second end 302 of the cords 30 are in the loose condition. A first length La1 is defined between the first end 301 of the cord 30 and the limiting member 210. In the meanwhile, the flexible portion 310 of the conduit 300 is stretched, and the lid 200 seals the container 100.

While the controller 20*a* is counter-clockwise rotated to the second position, the fastener 211*a* is rotated to wind the second ends 302 of the cords 30 by operating the handle 22*a*. In the meanwhile, the first end 301 and second end 302 of the cords 30 are in the tight condition. A second length La2 is defined between the first end 301 of the cord 30 and the limiting member 210. In the meanwhile, the flexible portion 310 of the conduit 300 shortens, and the lid 200 leaves the container 100.

The structure of the present invention exhibits advantages as follows:

Firstly, the dust collector of the present invention is stable. The cords 30 of the lid-opening apparatus 1 are respectively associated with two sides of the conduit 300 and the limiting members 210, and the limiting members 210 are separately installed on two sides of the lid 200 and corresponding to the two sides of the conduit 300. The lid 200 can keep balance while the user operates the lid-opening apparatus.

Secondly, the dust collector of the present invention is simple and effective. The controller 20, 20*a* is associated with the second ends 302 of the cords 30 so that the lid-opening apparatus 1 can be easily operated by controlling the handle 22, 22*a* of the controller 20, 20*a*.

The present invention has been described through the illustration of the embodiments. Those skilled in the art can derive variations from the embodiments without departing from the scope of the present invention. Hence, the embodiments shall not limit the scope of the present invention defined in the claims.

What is claimed is:

1. A lid-opening apparatus for a dust collector including a container, a lid sealable with the container, and a conduit in fluid communication with the container through the lid, the lid-opening apparatus comprising:

a base adapted to be installed on the lid;

a controller installed on the base;

at least one cord including a first end adapted to be connected with the conduit and a second end connected with the controller; and a limiting member adapted to be installed on the lid, wherein the limiting member abuts with and is located between the first end and the second end of the at least one cord;

wherein the controller is rotatable between a first position and a second position, wherein the at least one cord is in a loose condition with a flexible portion of the conduit being stretched and the lid sealing the container when the controller is in the first position, and wherein the at least one cord is in a tight condition with the flexible portion of the conduit shortened and the lid leaving the container when the controller is in the second position.

2. The lid-opening apparatus for the dust collector as claimed in claim 1, wherein the at least one cord comprises two cords with the first ends of the two cords respectively associated with two sides of the conduit and the second ends of the two cords respectively associated with two sides of the controller.

3. The lid-opening apparatus for the dust collector as claimed in claim 2, wherein the base includes a first portion adapted to be installed on the lid and a second portion for extending away from the lid, wherein the controller includes a frame and a handle, with the frame defining a proximal end connected to the second portion of the base and the handle and a distal end, wherein the handle crosses over the distal end of the frame.

4. The lid-opening apparatus for the dust collector as claimed in claim 3, wherein the frame is substantially T shaped.

5. The lid-opening apparatus for the dust collector as claimed in claim 3, wherein the first portion forms a grip for a user to take the lid up by grabbing the grip.

6. The lid-opening apparatus for the dust collector as claimed in claim 3, wherein the second portion is perpendicular with respect to the first portion.

7. The lid-opening apparatus for the dust collector as claimed in claim 3 further including two receiving portions respectively formed on two sides of the distal end of the frame, with the second ends of the two cords being respectively wound on the two receiving portions.

8. The lid-opening apparatus for the dust collector as claimed in claim 7 further including a bolt inserted through the distal end of the frame, and a nut screwed on the bolt, wherein one of the two receiving portions is formed between the frame and a head of the bolt, and wherein another of the two receiving portions is formed between the frame and the nut.

9. The lid-opening apparatus for the dust collector as claimed in claim 2 wherein the base includes a first portion adapted to be installed on the lid and a second portion extending away from the lid, wherein the controller includes a frame and a handle, wherein the frame has a fastener connected thereon, with the frame being pivotally assembled on the second portion of the base by the fastener, wherein the handle is associated with an edge of the fastener, wherein the second ends of the two cords are respectively associated with two sides of the fastener of the frame, and wherein the handle is rotated and the fastener is rotated to enable the two cords to be wound.

* * * * *